(12) United States Patent
Revie (10) Patent No.: US 7,155,368 B2
(45) Date of Patent: Dec. 26, 2006

(54) DATA MANAGEMENT (75) Inventor: Hugh Revie, Ayrshire (GB)

(73) Assignee: Data Systems & Solutions Limited, Derby (GB)

(*) Notice: Subject to any disclaimer, the term of this patent is extended or adjusted under 35 U.S.C. 154(b) by 38 days.

(21) Appl. No.: 10/482,593

(22) PCT Filed: Jun. 7, 2002

(86) PCT No.: PCT/GB02/02755

§ 371 (c)(1),
(2), (4) Date: Dec. 22, 2003

(87) PCT Pub. No.: WO03/003257

PCT Pub. Date: Jan. 9, 2003

(65) Prior Publication Data

US 2004/0177177 A1    Sep. 9, 2004

(30) Foreign Application Priority Data

Jun. 28, 2001   (GB) ................................ 0115830.2

(51) Int. Cl.
G06F 11/30 (2006.01)
G06F 15/00 (2006.01)
G21C 17/00 (2006.01)

(52) U.S. Cl. ...................................... 702/184; 702/189
(58) Field of Classification Search ........ 702/182–186, 702/188, 189, 196; 707/1, 2, 10, 100, 200; 709/217, 219; 713/200, 202
See application file for complete search history.

(56) References Cited

U.S. PATENT DOCUMENTS 5,404,516 A * 4/1995 Georgiades et al. ........ 718/104
6,167,376 A   12/2000 Ditzik
2002/0012445 A1 * 1/2002 Perry ......................... 382/100
2004/0021691 A1 * 2/2004 Dostie et al. ............... 345/773

FOREIGN PATENT DOCUMENTS

| EP | 0 602 673 A2 | 6/1994 |
| EP | 0 841 630 A2 | 5/1998 |
| EP | 1 020 817 A1 | 7/2000 |

OTHER PUBLICATIONS

*Fact Sheet*, "enginedatacenter.com", Data Systems & Solutions, Reston, VA USA (May 2001).
*Fact Sheet*, "Engine Health Monitoring Services", Data Systems & Solutions, Reston, VA USA (May 2001).

* cited by examiner

*Primary Examiner*—Michael Nghiem
(74) *Attorney, Agent, or Firm*—Drinker Biddle & Reath LLP (57) ABSTRACT A data management system for obtaining data, relating to the maintenance and performance of an asset, processing the data and delivering it to an end user. A predetermined data set is collected and transmitted, and stored. The data are reconfigured into a predetermined format. An end user interface allows an end user to read the reconfigured data. Also provided is a computer apparatus for the management of data relating to the maintenance and performance of an asset, which generates a graphical user interface on a display screen. The graphical user interface consists of a data packet containing at least one data input section with at least one data field. Each section contains a text field which is capable of receiving, reading, and uniquely identifying hand written text.

7 Claims, 7 Drawing Sheets

DATA MANAGEMENT

FIELD OF THE INVENTION

The present invention relates to asset performance data management, in particular to the management of data relating to the performance and maintenance of an asset such as an aircraft.

BACKGROUND OF THE INVENTION

In all industries, there is a need to carefully monitor the performance of assets. In the aircraft industry, technical data relating to an aircraft's performance and maintenance must be collected and monitored so that the aircraft can be certified safe for flight. Current aircraft performance and maintenance systems include data storage means which collect data manually from the aircraft. However, these systems are not good for collecting new data as there is a time lag between collecting the data and adding it to the database. In addition, there is a high risk of human error when the data is collected and of misinterpretation of the data.

SUMMARY OF THE INVENTION

According to a first aspect of the invention there is provided a data management system for obtaining data, processing data and delivering data to an end user, said data relating to the maintenance and performance of an asset, the data management system comprising;
data collection means configured to allow collection of a predetermined data set and to allow said data set to be transmitted from the data collection means;
data storage means capable of receiving data transmitted from the data collection means; data processing means capable of reconfiguring said data into a predetermined format; and
end user interface means to allow an end user to read said reconfigured data.

Preferably said asset is an aircraft.

Preferably, the data collection means comprises a portable computing device.

More preferably, the data collection means comprises a hand-held computing device.

Optionally, said data is transmitted from the data collection means using mobile communications technology.

For example, GSM technology may be used for this purpose or other suitable communications technology.

More preferably, said portable computing device contains at least one data input field and a text input field capable of reading and uniquely identifying hand written text.

Optionally, the text field can function as means for authenticating the input data so that the data in the data fields will not be accepted without an authenticated "signature" in the text field.

Preferably, said data storage means comprises a database.

Preferably said end user interface means comprises a first secure communications link to the data storage and data processing means such that the end user has direct access to the data storage and data processing means.

Preferably said end user interface means further comprises a database and web server connected to a second secure communications link such that the end user has access to the data storage and data processing means via the internet.

Preferably, the end user can define and send specific tasks to the data collection means over the first communication link.

Preferably, the end user can define and send specific tasks to the data collection means over the second communication link.

In accordance with a second aspect to the present invention there is provided computer apparatus for the management of data relating to the maintenance and performance of an asset, comprising means for generating a graphical user interface on a display screen, the graphical user interface consisting of a data packet containing at least one data input section, said data input section having at least one data field, wherein each section contains a text field which is capable of receiving, reading and uniquely identifying hand written text.

Preferably, the computer apparatus further includes means for interrogating the at least one data input field and the text field such that the computer will recognise the section as complete once all of the at least one data fields have been completed and the text field has been completed with the correct, uniquely identifiable hand written text.

Preferably, the computer apparatus further includes means for checking that all of the at least one data input sections in the data packet have been completed.

Preferably, the computer apparatus comprises means to receive additional data from a remote source corresponding to an additional maintenance task, and to create at least one additional data entry corresponding to the task.

Preferably, the hand written text is the signature of the user.

Preferably the asset is an aircraft.

Preferably, each data input section contains a plurality of fields capable of receiving data related to the performance and maintenance of the aircraft. In particular, sectors flown, data relating to re-fuelling, oil and hydraulic fluid, anti-ice and de-icing, scheduled maintenance, information on recorded defects, notes on maintenance to/from the crew, serious incidents and other maintenance and operational information, including specifically defined tasks.

In accordance with a third aspect of the present invention, there is provided a method of managing data relating to the maintenance and performance of an asset, the method comprising the steps of: collecting the data from the asset; transmitting said data to a central location containing data; processing and data storage means where the data is reconfigured; and transferring said data to an end user interface to allow an end user to read said reconfigured data.

An embodiment of the invention will now be described, by way of example only, with reference to the accompanying drawings, in which.

BRIEF DESCRIPTION OF THE INVENTION

DETAILED DESCRIPTION OF THE PREFERRED EMBODIMENTS

In the following embodiments, a service provider supplies data entering devices in the form of handheld computers, and also provides a data management system to various users.

Figure 1A:
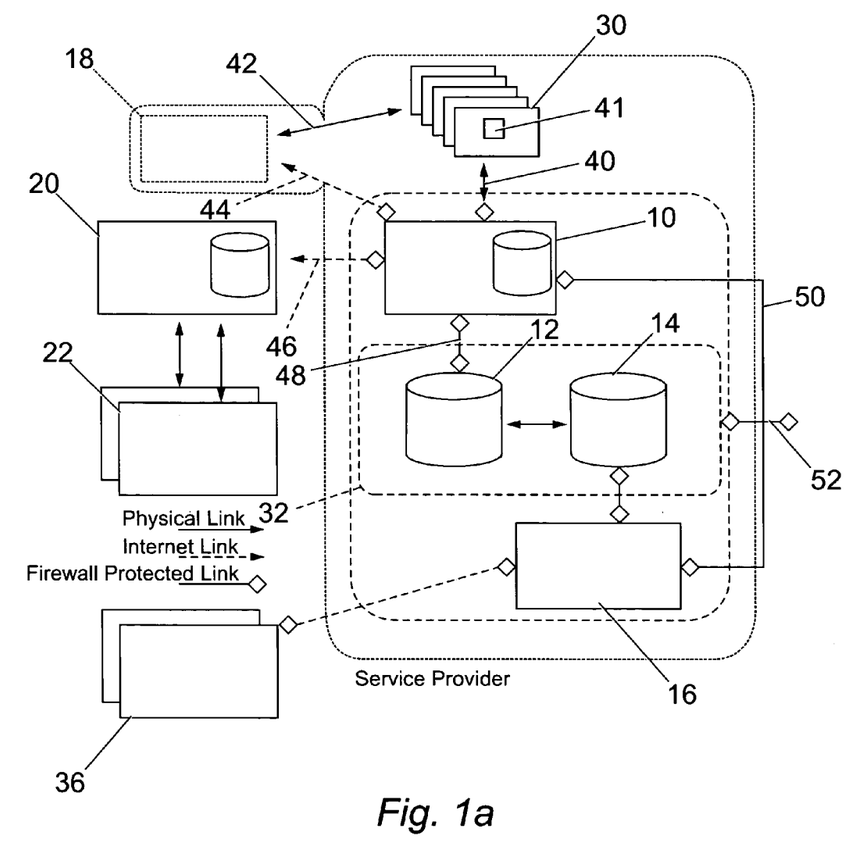
FIG. 1a shows the system architecture of an embodiment of the present invention and FIG. 1b shows the system architecture of the embodiment of FIG. 1a without a synchronisation server.

FIG. 1a shows an overview of the system architecture.

The data from the handheld computers 30 is transmitted via a secure communications link 40 using mobile telecommunications technology to the service provider's data exchange server and database 10. The handheld computers 30 include means 41 for interrogating the at least one data input field and the text field. In this example, the data is also transmitted via a secure physical link 42 to a synchronisation server 18. The synchronisation server 18 communicates via secure communications link 44 with the service provider's data exchange server and database 10 to provide means for the server 10 to co-ordinate the incoming data.

The service provider's data exchange server and database 10 then transmits the data via a secure internet link 46 to the user's data exchange server and database 20 (and thereafter to their internal systems 22) and via physical links 48, 50 to the service provider's user database 12 and the service provider's web server 16.

The service provider's web server 16 also obtains data from a web server database 14. This web server database 14 is linked to the user database 12, and these two databases 12, 14 form a secure network 32.

The web server 16 is accessible to users via the internet.

All connections to the service provider's data exchange server and database 10, secure network 32, and web server 16 are protected by firewalls to help provide data integrity and security. The user's means of accessing the internet 36 can also be protected by a firewall. In addition, the service provider's databases 10, 12, 14, and web server 16 are connected by a firewall protected physical link 52 to the service provider's computer network.

Figure 1B:
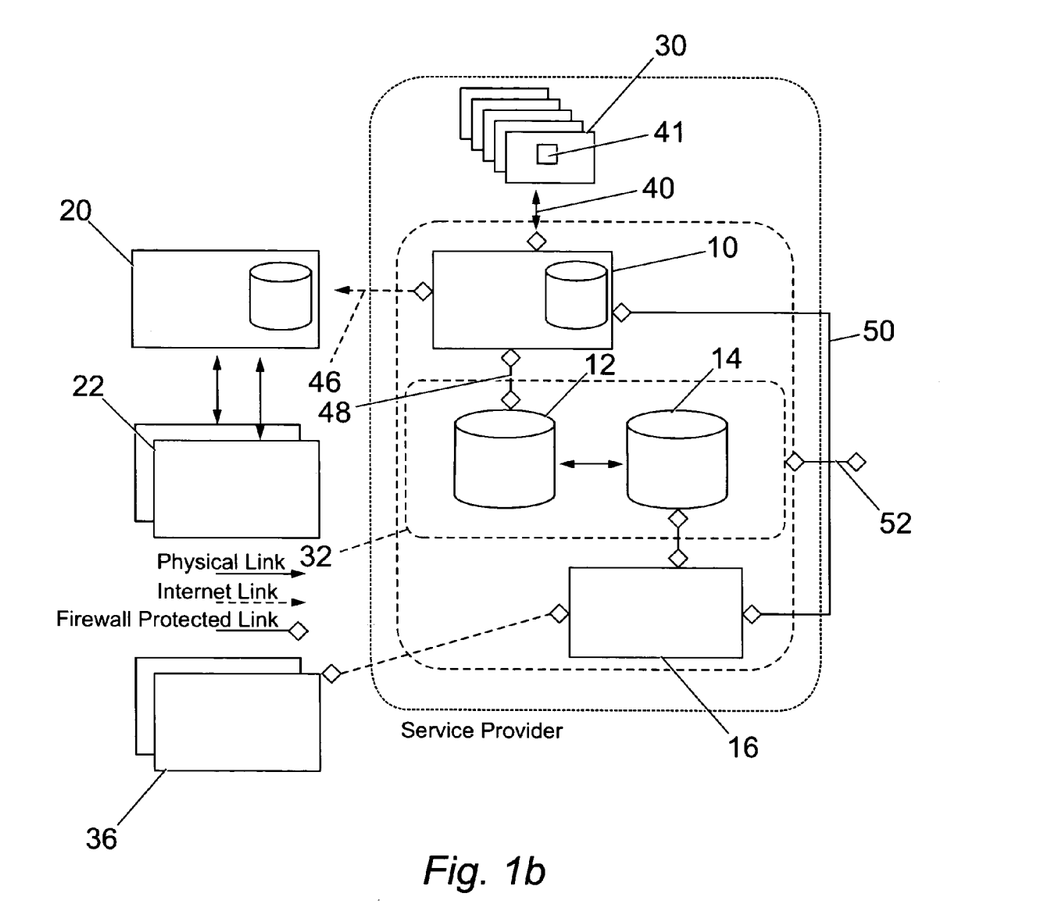

FIG. 1b shows a similar system architecture to that shown in FIG. 1a but without a synchronisation server. In this example therefore, time synchronisation is provided outwith the system architecture of the invention.

Two particularly preferred embodiments are envisaged for the present invention, in which the basic system architecture of FIGS. 1a and 1b can be implemented with or without real time replication to a user's exchange server and database 20. In the case of the second embodiment, where there is no real time replication to a user's exchange server and database 20, the data transferred from the service provider's exchange server and database 10 via the secure internet link 46, is transmitted directly to the user's systems 22. In addition, it is possible for the data alone to be replicated onto the customer's site or for the data to be accessed remotely by the customer without replication on their site.

Figure 2:
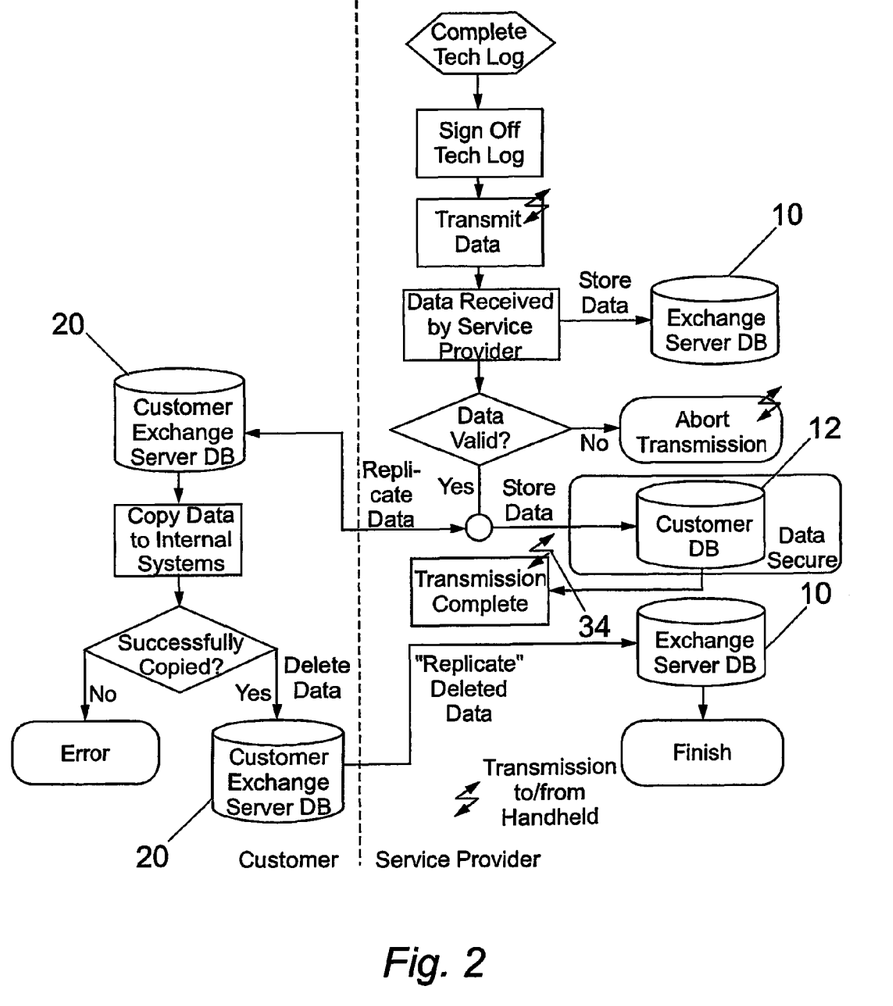
FIG. 2 illustrates a data transmission process for use in the embodiment of the present invention of FIG. 1.
Figure 3:
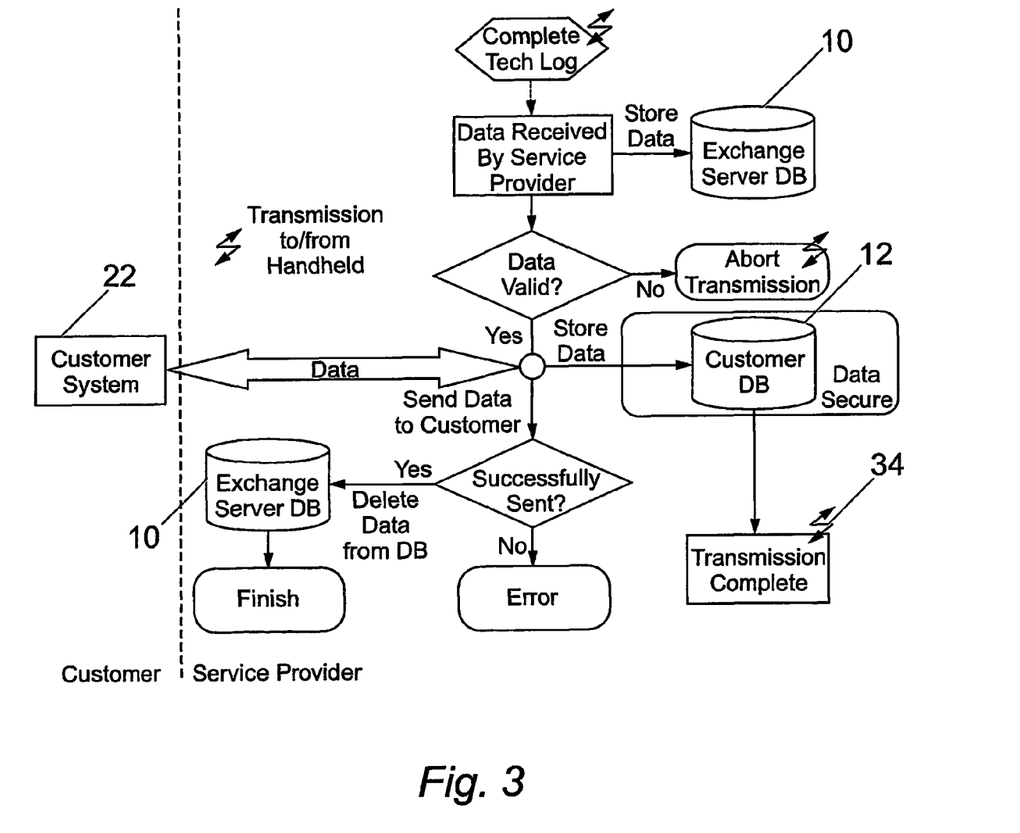
FIG. 3 shows an alternative data transmission process for use with the present invention.

FIGS. 2 and 3 describe the transmission of data to and from the service provider's exchange server and database 10, over links 40, 46 and 48. The flow charts describe the decision processes and checks carried out to regulate data transmission through these links.

In a preferred embodiment, the data transfer process is enabled with real-time data replication to a server system 20 within a user's organisation. This is illustrated in FIG. 2, which shows more detail of the data exchange process between the service provider's exchange server 10 and user database 12, and the user's exchange server database 20.

As described above, the data is entered in the handheld computer 30, signed off, and transmitted. The data is then received by the service provider, upon which it is stored in the service provider's exchange server database 10. A check is also performed to test the validity of the data. If the data is found to be invalid, the transmission is aborted, otherwise the data is both replicated to the user's exchange server database 20, and stored in the service provider's user database 12.

Data replicated to the user's exchange server database 20 may then be copied to the user's own internal systems 22. The success of this copying is verified, with an error message being displayed if the data is not successfully copied, before the data is then deleted from the user's exchange server database 20. This deleted data is replicated to the service provider's exchange server database 10, updating it to ensure that the data contained in the service provider's and the user's systems 10, 20 matches.

Data stored in the service provider's user database 12 is stored securely, upon which a signal 34 is sent back to the handheld computer 30 confirming completion of transmission.

In addition, the customer can send information to the handheld devices 30 via the end user interface 52.

In a second embodiment, the data transfer process is enabled without real-time data replication to a server system 22 within a user's organisation. This is illustrated in FIG. 3. The data is entered in the handheld computer 30, signed off, and transmitted. The data is then received by the service provider, upon which it is stored in the service provider's exchange server database 10. A check is also performed to test the validity of the data. If the data is found to be invalid, the transmission is aborted, otherwise the data is both sent directly to the user and stored in the service provider's user database 12.

Data stored in the service provider's user database 12 is stored securely, upon which a signal 34 is sent back to the handheld computer 30 confirming completion of transmission.

A check is performed to verify successful transmission of the data to the user. If this is not confirmed, an error message is displayed. If transmission is successfully verified, the data is deleted from the service provider's exchange server database 10.

Figure 4:
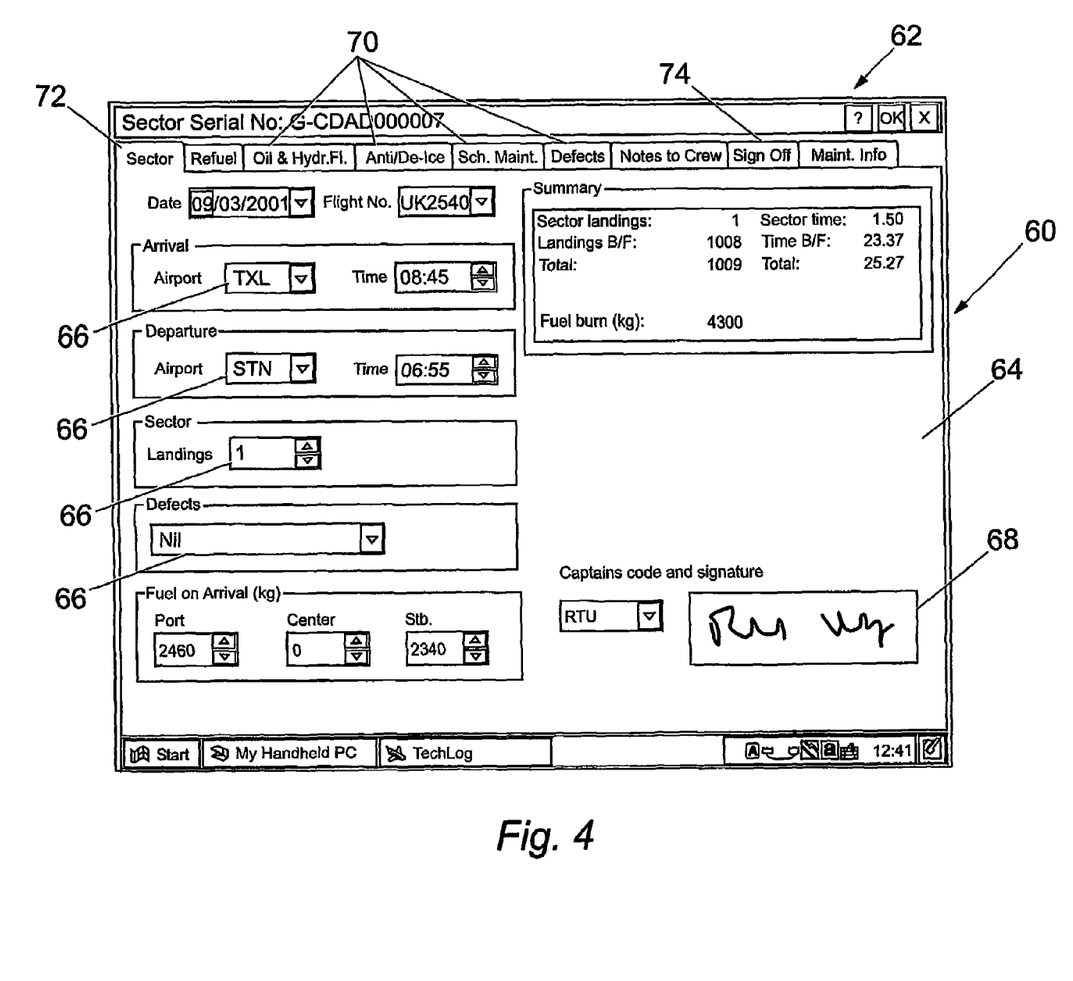
FIG. 4 shows a user interface of a hand held device of the embodiment of the present invention of FIG. 1.
Figure 5:
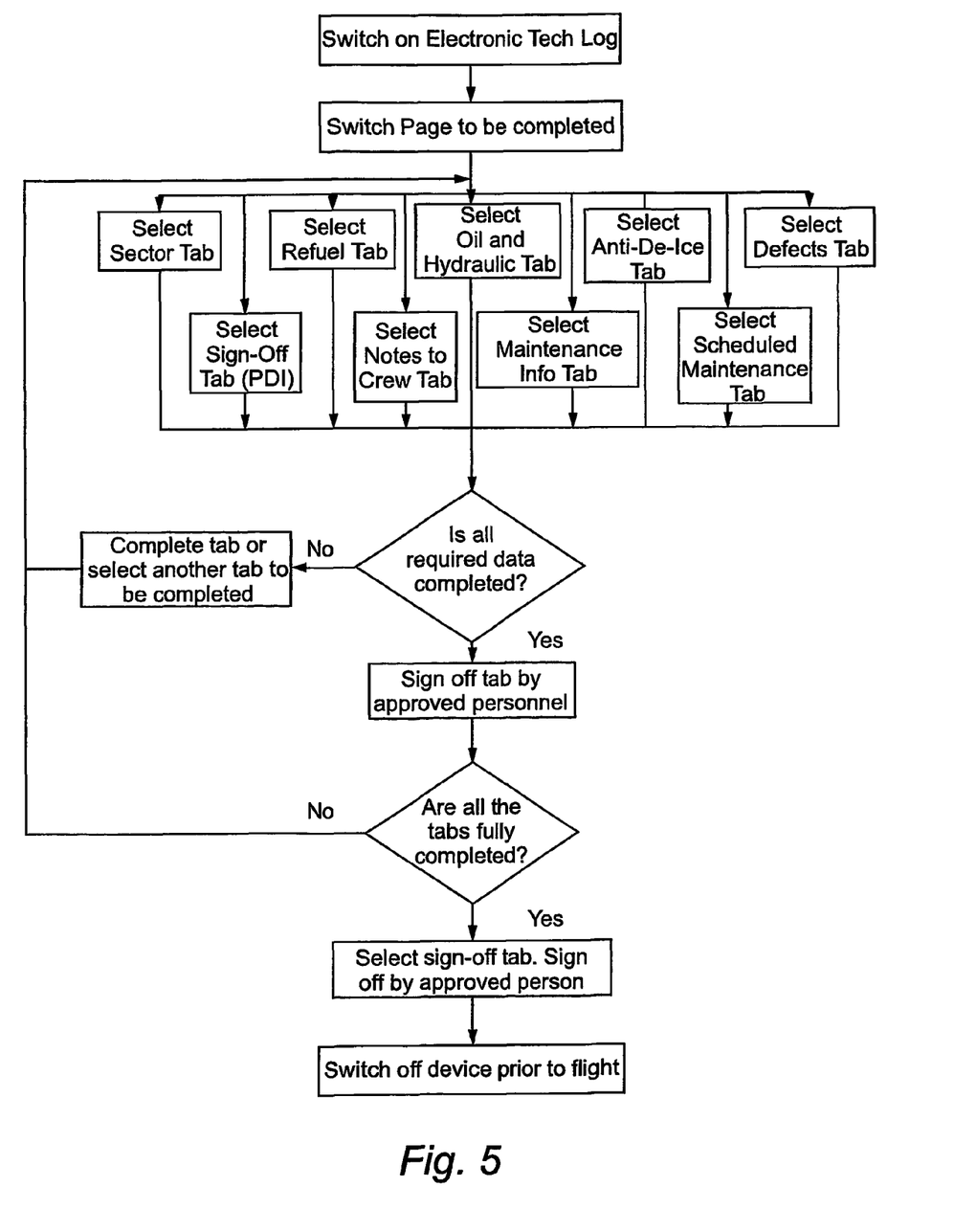
FIG. 5 illustrates the process of data entry used in an embodiment of the present invention.

FIGS. 4 and 5 describe the data entry process where the asset in question is an aircraft and the recorded data relates to technical maintenance. Data relating to the preparation of an aircraft for flight is entered directly into a handheld computer 30 while the aircraft is on the ground. This handheld computer 30 stays with the aircraft and constitutes its electronic technical log.

As seen in FIG. 4, the data to be collected, or data packet for each flight is entered into a user interface 60. Each page 64 of the user interface represents maintenance and performance information for the aircraft. The pages 64 are labelled by tabs 70, and organised on-screen so that all tabs 70 are visible and available for selection in a row along the top of the screen 62, the contents of (i.e. the page represented by) the currently selected tab 72 filling the main part of the screen 62.

In this example, the pages 64 relate to different types of technical information necessary to provide a maintenance and performance record. These are:

the sector in which the aircraft is operating;
re-fuelling data;
oil and hydraulic fluid data;
anti-ice and de-icing data;
scheduled maintenance;
information on recorded defects;

notes on maintenance to/from the crew; and
other maintenance and operational information.

Entries made in each page 64 must be validated by entering a signature 68 of an authorised person in each page 64.

The handheld computer 30 allows entries for previous flights to be accessed, and also displays a list of all outstanding carried-forward defects for the aircraft and provides a facility whereby a carried forward defect can be transferred into the entry for the current flight and resolved.

The system can also deal with out of phase maintenance tasks. Such tasks are routine maintenance tasks that are not undertaken at the same regular intervals as the remainder of the everyday maintenance tasks.

In particular, a two-way communication link can be established between the handheld devices 30 and the customer internet access means. This is used to send a prompt to the handheld devices informing them of the extra tasks that need to be carried out, so that the appropriate maintenance can be performed. These out of phase tasks appear on an extra page 64 that needs to be signed off in a similar manner to the standard pages as described above.

In this way, a user of the system can have flexible control of the maintenance of his fleet of aircraft from his own website, inputting specific maintenance tasks to be carried out on specific aircraft.

FIG. 5 shows the process of data entry. The user accesses the programme and selects the tab 72 representing the page 64 into which data is to be input. The system checks that all data entry fields 66 in a tab 70 have been filled in before allowing the tab 70 to be signed off. Following a successful signing off, the system then performs a check over all tabs 70 to see if every tab 70 has been signed off. If not, the user has to go back and complete the data entry, after which the sign-off tab 74 can be selected and signed off. This tab 74 is the last tab 70 to be filled in, and represents a general checking of completeness of the data entry, and authorisation to transmit the data.

Progress on these tasks is transmitted back to the data exchange server 10.

Completed entries are transmitted from the handheld computer 30 to a server computer system 10, and the handheld computer 30 is then switched off before the aircraft takes off. The wireless transfer of data is achieved by means of mobile communications technology in this example.

Figure 6:
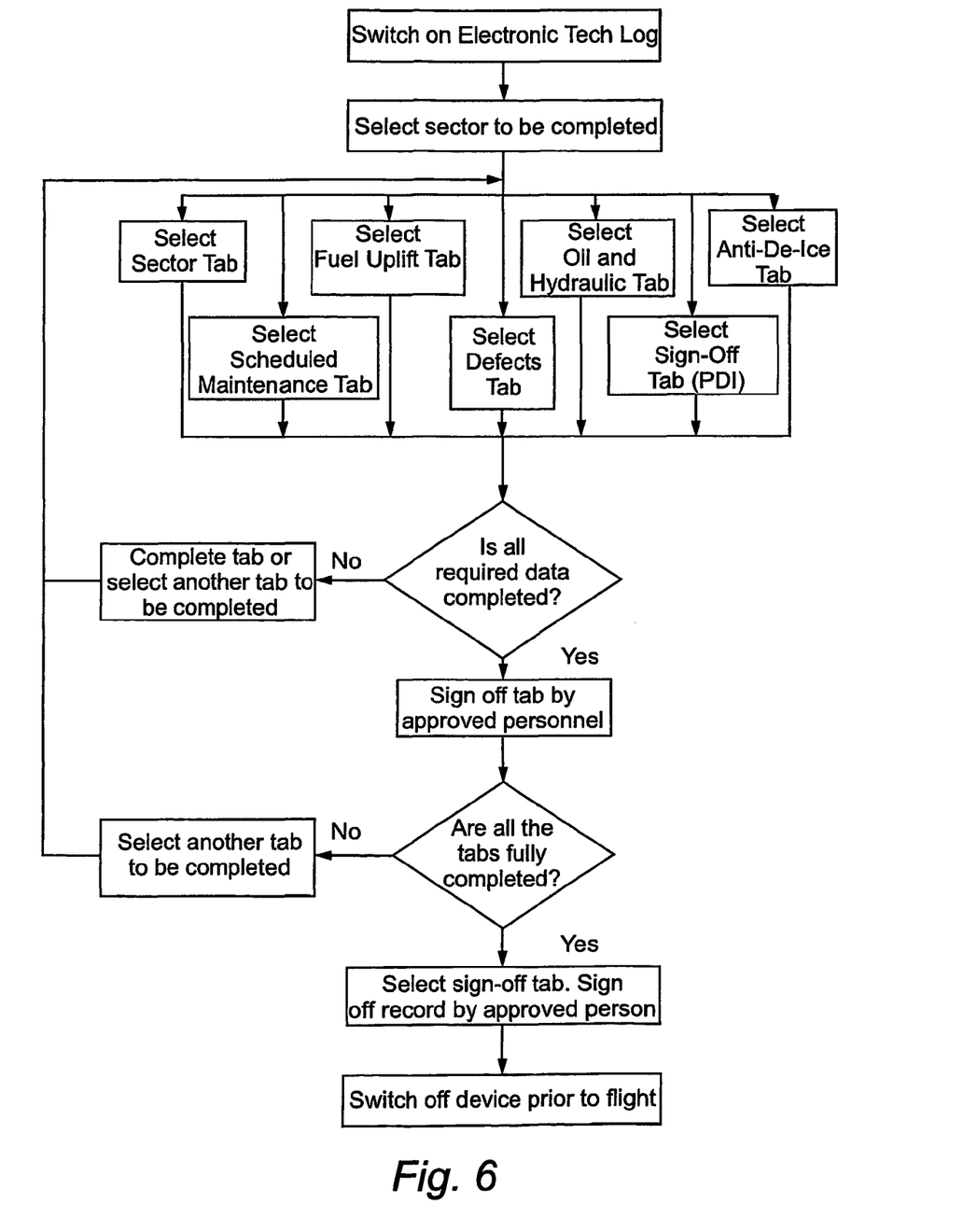
FIG. 6 is a further illustration of the process of data entry used in an embodiment of the present invention.

FIG. 6 shows a similar process of data entry, in which an alternative selection of tabs is provided. This further example is included to indicate the general versatility of the system, showing that the same principles can be used to manage data for any data management, in particular to data relating to the performance and maintenance of an asset.

The processes described are designed to ensure data integrity, security and availability.

Checks are put in place during the data entry process to ensure that the data is not transmitted until all information has been filled in and all pages are properly authorised; the validity of the data is checked again after transmission before being sent to the user; the data is stored on the exchange servers 10, 20 as well as the service provider's secure network 32 and transfer of data is firewall protected.

In addition to the availability on the user's own system 10, the user can also access the data via the internet, with the information only being accessible to authorised users. The website can contain modules to manipulate the raw data collected, and use it together with data collected from previous flights to provide more in-depth analysis. In the case of aircraft maintenance, information could be made available in the following forms:

Data from a single flight, including the authorisation signatures, can be viewed and/or printed off.

Summary information on flights for a single aircraft or an entire fleet can be viewed and/or printed.

Detailed analysis of information, for example utilisation analysis, defects analysis, or components analysis.

This internet connection provides immediate and secure world-wide access to the information.

The present invention allows:

entry of technical log data directly at a source using a handheld computer;

wireless transfer of technical data to a server computer prior to take-off; and immediate and secure world-wide access to information based on transferred data via the internet.

Whilst the embodiment of the present invention set out above relates to aircraft maintenance and performance, the present invention may be applied within different industries where data for monitoring the status assets is required.

Improvements and modifications can be incorporated to the above without departing from the scope of the present invention.

The invention claimed is:

1. Computer apparatus for the management of data relating to the maintenance and performance of an asset, comprising means for generating a graphical user interface on a display screen, the graphical user interface consisting of a data packet containing at least one data input section, said data input section having at least one data field, wherein each section contains a text field which is capable of receiving, reading and uniquely identifying hand written text, and wherein the computer apparatus further includes means for interrogating the at least one data input field and the text field such that the computer apparatus will recognise the section as complete once all of the at least one data fields have been completed and the text field has been completed with the correct, uniquely identifiable handwritten text.

2. Computer apparatus as claimed in claim 1, wherein the computer apparatus further includes means for checking that all of the at least one data input sections in the data packet have been completed.

3. Computer apparatus as claimed in claim 1, wherein the computer apparatus comprises means to receive additional data from a remote source corresponding to an additional maintenance task, and to create at least one additional data entry corresponding to the task.

4. Computer apparatus as claimed in claim 1, wherein the hand written text is the signature of the user.

5. Computer apparatus as claimed in claim 1, wherein the asset is an aircraft.

6. Computer apparatus as claimed in claim 1, wherein each data input section contains a plurality of fields capable of receiving data related to the performance and maintenance of the aircraft.

7. Computer apparatus as claimed in claim 6, wherein the data related to the performance and maintenance of the aircraft includes data relating to at least one of the following categories: sectors flown, data relating to re-fuelling, oil and hydraulic fluid, anti-ice and de-icing, scheduled maintenance, information on recorded defects, notes on maintenance to/from the crew, serious incidents, any other maintenance and operational information, including specifically defined tasks.

* * * * *